United States Patent [19]

Esposito et al.

[11] Patent Number: 5,108,697
[45] Date of Patent: Apr. 28, 1992

[54] INHIBITING STRESS CORROSION CRACKING IN THE PRIMARY COOLANT CIRCUIT OF A NUCLEAR REACTOR

[75] Inventors: John N. Esposito; Judith B. Esposito, both of Swissvale; Fredric W. Pement, Pittsburgh, all of Pa.

[73] Assignee: Westinghouse Electric Corp., Pittsburgh, Pa.

[21] Appl. No.: 600,465

[22] Filed: Oct. 19, 1990

[51] Int. Cl.5 .................................................. G21C 9/00
[52] U.S. Cl. ..................................... 376/306; 376/305; 376/312; 376/310
[58] Field of Search ............... 376/306, 305, 906, 312, 376/310; 148/162, 428, 426, 427; 420/441, 442, 459; 252/631, 389.52, 400.52

[56] References Cited

U.S. PATENT DOCUMENTS

| | | | |
|---|---|---|---|
| 4,722,823 | 2/1988 | Honda et al. | 376/306 |
| 4,756,874 | 7/1988 | Ruiz et al. | 376/306 |
| 4,759,900 | 7/1988 | Peterson et al. | 376/306 |
| 4,828,790 | 5/1989 | Honda et al. | 376/306 |
| 4,877,465 | 10/1989 | Donati et al. | 148/428 |
| 4,950,449 | 8/1990 | Petersen et al. | 376/306 |
| 5,014,760 | 5/1991 | Bombeke et al. | 152/451 |

FOREIGN PATENT DOCUMENTS 0338769 10/1989 European Pat. Off. .

OTHER PUBLICATIONS

Electric Power Research Institute Report 6168, Jan. 1989.
Electric Power Research Institute Report 4447, Mar. 1986.

Primary Examiner—Donald P. Walsh
Assistant Examiner—Meena Chelliah
Attorney, Agent, or Firm—J. C. Valentine

[57] ABSTRACT

A primary coolant circuit for cooling a nuclear reactor has wetted mechanically stressed nickel base alloy components such as Alloy 600 tubes in steam generators having oxidized surfaces comprising 1-10 w/o zinc, which tubes are inhibited against primary water stress corrosion cracking. The crack initiation times may be delayed by a factor of two in pressurized water nuclear reactors.

20 Claims, 6 Drawing Sheets

INHIBITING STRESS CORROSION CRACKING IN THE PRIMARY COOLANT CIRCUIT OF A NUCLEAR REACTOR

This invention relates to a method of inhibiting stress corrosion cracking in a primary coolant circuit of a nuclear reactor and, more particularly, to a method for inhibiting stress corrosion cracking of mechanically stressed components fabricated of nickel based alloys such as bent or expanded tubes of a steam generator in a primary coolant circuit and to such inhibited components.

BACKGROUND OF THE INVENTION

Years of operating experience with nuclear reactors has revealed that nickel base alloy components in the primary (i.e., the reactor) coolant circuits such as steam generator tubes and tube plugs may be susceptible to primary water stress corrosion cracking in the reactor coolant. The susceptible components are fabricated from alloys which generally comprise at least about 60 weight percent nickel, about 13–30 weight percent chromium, and about 3–12 weight percent iron. Such nickel base alloys are generally members of the 600 and 700 alloy series, including Alloy 600, 690, X750 and the like. These alloys may also contain controlled amounts of cobalt, molybdenum, aluminum, titanium, columbium, tantalum, zirconium, copper, manganese, silicon and carbon. Inconel 600 alloy, for example, comprises at least 72 w/o nickel, 14–17 w/o chromium, 6–10 w/o iron, and no more than 0.5 w/o silicon, 1.0 w/o manganese, 0.15 w/o carbon, 0.5 w/o copper and 0.015 w/o sulfur. The symbol "w/o" is employed in this disclosure to indicate the element as "weight percent" of the total. The nuclear industry is very reluctant to add any element or compound to the primary coolant and thereby create unintended (and then unforeseeable) side effects. Any change on the primary coolant side is made only after conducting extensive qualification testing and the test results widely accepted by the nuclear industry.

In the last two decades researchers studying radiation causes in boiling water reactors have found that the addition of zinc to the primary coolant water advantageously reduces the buildup of radioactive deposits in the recirculating piping of the reactors. See, in this regard, Electric Power Research Institute (EPRI) Interim Report NP-4474, dated Mar. 1986, by W. J. Marble, entitled "BWR Radiation-Field Control Using Zinc Injection Passivation" and U.S. Pat. Nos. 4,759,900 and 4,756,874. (It has also been found in recent years that the addition of zinc to the primary coolant water of pressurized water nuclear reactors reduces the buildup of cobalt-60; see, in this regard, U.S. Ser. No. 184,557 filed Apr. 20, 1988 by the assignee of the present application.) The EPRI report states that small scale reactor qualification studies relating to the addition of zinc to the coolant fluid in an autoclave simulating boiling water nuclear reactors indicate that the addition of zinc does not appear to increase the susceptibility of sensitized stainless steel to intergranular stress corrosion cracking. This is a particular concern because stainless steel is a principal material of construction employed in boiling water nuclear reactors. In addition, Section 6 of the EPRI report further indicates that the researchers also determined that addition of zinc to the autoclave did not degrade the intergranular stress corrosion resistance of Inconel 600 and X750 test coupons in 290° C. water. These coupons were removed from the autoclave and then tested using constant extension rate and creviced bent beam procedures.

SUMMARY OF THE INVENTION

It is an object of the present invention to inhibit stress corrosion cracking in nickel base components employed in the primary cooling circuits of nuclear reactors. It is a particular object of the present invention to delay the crack initiation times of mechanically stressed components such as steam generator tubes and plugs fabricated from Alloy-600 and like alloys.

It has been unexpectedly found that mechanically stressed components of a primary coolant circuit which are fabricated from alloys comprising at least about 60 w/o nickel, about 13–30 w/o chromium and about 0.3–12 w/o iron and which have oxidized surfaces wetted by the primary coolant containing about 1–10% zinc in the top 50 Angstroms (as determined by electron spectroscopy) of the oxide, are substantially more stress corrosion resistant in primary coolant circuits than are similar components having surface oxides containing smaller amounts of zinc. Preferably, the top 50 Angstroms of the oxidized surfaces comprise at least about 15 w/o nickel, about 5–20 w/o chromium, about 2–20 w/o iron and at least about 25 w/o oxygen in addition to about 3–7 w/o zinc. Stress corrosion crack initiation tests conducted on specimens taken from reverse U bends of small (less than 1 inch [25 mm]) diameter Alloy 600 tubes at about 330° C. have shown that crack initiation times may be delayed by a factor of two or more in primary coolant circuits.

In the practice of the present invention, the surface of nickel base alloy components of a nuclear reactor primary circuit such as bent tubes and tube plugs in a steam generator section are oxidized and zinc is introduced into the oxidized surface to produce a concentration of at least about 1 w/o in the top 50 Angstroms. The primary coolant is circulated through the circuit to cool the reactor with reduced primary side stress corrosion cracking of the steam generator tubes, tube plugs and like nickel base alloy components.

It has been found in tests conducted for over 1000 hours that under pressurized water nuclear reactor conditions where the coolant water is maintained at about 1–2500 ppm boron, about 0.1–10 ppm lithium, about 15–75 cc (STP) hydrogen/kg water, at a pH between about 5.2 and 7.4 at 20° C. and a conductivity between about 1 and 30 $\mu$S/cm at 20° C., the addition of zinc to the circulating coolant water in amounts sufficient to maintain the zinc concentration between about 5 and 1000 ppb zinc effectively delays stress corrosion cracking of mechanically stressed Alloy 600 components. It has also been found that the crack initiation time of the Alloy 600 components can be substantially reduced by maintaining the coolant water concentration at between about 100 and 1000 ppm boron and between about 0.1 and 3 ppm lithium and the pH between about 6.0 and 7.2 at 20° C. and adding zinc in sufficient amounts to maintain a zinc concentration in the coolant water of between about 10 ppb and about 200 ppb.

DESCRIPTION OF THE DRAWINGS

The invention will become more readily apparent from the following description of a preferred practice thereof and the accompanying figures, wherein.

DESCRIPTION OF A PREFERRED PRACTICE

In the practice of the present invention, stress corrosion cracking of highly stressed nickel base alloy components of the primary coolant circuits of pressurized water and boiling water nuclear reactors may be substantially delayed by the introduction of zinc into oxidized surfaces of the components which are wetted by the primary coolants. The components include steam generator tubes (which may have reverse U bends), tube plugs and similar cold formed articles. The alloy generally comprises at least about 60 w/o nickel, about 13-30 w/o chromium and about 0.3-12 w/o iron, which includes Alloys 600, 690 and X750. More than about 1 w/o zinc may be introduced into the top layers of the oxidized surfaces of the components by aqueous solutions (and preferably by the primary coolant) containing 5-1000 ppb zinc ions. The top 50 Angstroms of the oxidized surfaces generally comprise at least about 15 w/o nickel, about 5-20 w/o chromium, about 2-20 w/o iron, about 1-10 w/o zinc and at least about 25 w/o oxygen (as determined by Auger electron spectroscopy).

In a particularly preferred embodiment, the top 50 Angstroms of the components have about 3-7 w/o zinc.

In the preferred practice of the present invention, the primary coolant water in a pressurized water nuclear reactor is circulated through mechanically stressed tubes, piping and other components fabricated from high nickel alloys such as Alloy 600 to introduce zinc into their oxidized surfaces. Over the life of a reactor charge, the coolant water composition is maintained between about 1-2500 ppm boron, about 0.1-10 ppm lithium and about 15-75 cc (STP) hydrogen. Also the pH is maintained between about 5.2 and 7.4 and the conductivity is maintained between about 1 and 30 $\mu$S/cm at 20° C. Preferably, the boron concentration is maintained between about 100 and 1000 ppm, the lithium concentration is maintained between 0.1 and 3 ppm, the pH between about 6.0 and 7.2 at 20° C. and the conductivity between about 1 and 15.

Zinc is added to the circulating coolant water in amounts sufficient to maintain the zinc concentration between about 5 and 1000 ppb zinc. Preferably the zinc is continuously added to the coolant water, but in other practices a zinc-containing prefilm may be formed on the components in the primary coolant water circuit prior to circulating coolant water containing negligible or smaller amounts of zinc. Thus, for example, a prefilm may be formed by an aqueous solution containing 20 ppb or more zinc and then the primary coolant water containing substantially less than 20 ppb zinc may be circulated. The zinc concentration of the circulating primary coolant may be less than 1 ppb in some situations. In other practices, the zinc concentration of the primary coolant may be increased from time to time to restore the nominal concentration of zinc in the circuit. Over most of the life of the reactor charge, the coolant water concentration is maintained between about 100 and 1000 ppm boron and about 0.1 and 3 ppm lithium, and the pH is maintained between about 5.7 and 6.3, while zinc is added in amounts sufficient to maintain a zinc concentration between about 10 ppb and 200 ppb. The high hydrogen level maintains the dissolved oxygen content at minimum levels by reducing radiolytic oxygen concentrations to acceptable levels. The lithium (which is added as lithium hydroxide) maintains the pH of the coolant water without introducing an unacceptable source of radiolytic isotopes. The boron (which is added as boric acid) absorbs neutrons to chemically shim the reactor.

The zinc may be added as a metal or as a salt such as zinc borate or in another sufficiently soluble form for maintaining up to about 1 ppm zinc ions in the coolant water. Preferably, the zinc is substantially enriched in the Zn-66, Zn-67 and Zn-68 isotopes, since the Zn-64 isotope is a source of Zn-65, which has undesirable radiation characteristics.

Figure 1:
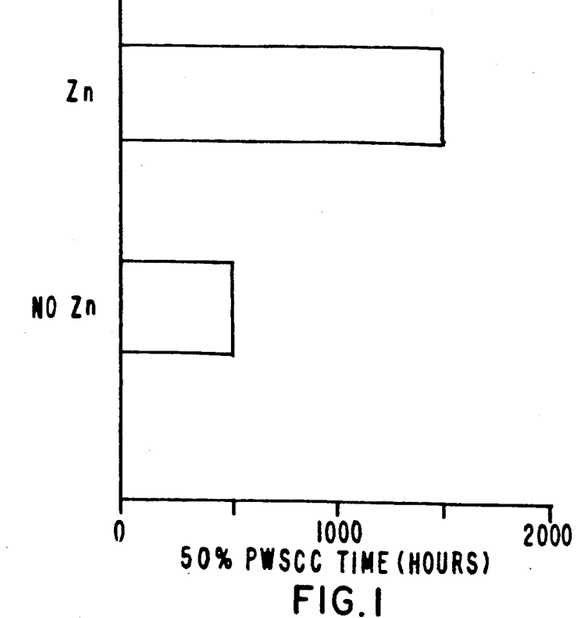
FIG. 1 is a bar graph showing the crack initiation time of Alloy 600 test specimens in a prior art practice and in the improved practice.

Crack initiation tests were conducted on Alloy 600 test specimens taken from mechanically stressed tubes in an aqueous solution at about 330° C. to simulate mechanically stressed components in a primary coolant circuit. The solution contained 2 ppm lithium and 1200 ppm boron and from about 10 to 100 ppb zinc. The aqueous solution also contained 15-75 cc (STP) hydrogen/kg water and had a pH between about 5.2 and 7.4 at 20° C. and a conductivity between about 1 and 30 $\mu$S/cm$^2$ at 20° C. Similar Alloy 600 test specimens were introduced into a control solution containing no added zinc but otherwise identical to the first solution. The bar graph of FIG. 1 indicates that 50% of the test specimens in the control solution developed cracks in about 500 hours whereas 50% of the test specimens in the zinc-containing solution developed cracks in about 1500 hours. FIG. 1 indicates that the crack initiation time may be significantly delayed by adding zinc to the water in the primary coolant of a pressurized water nuclear reactor.

Figure 2:
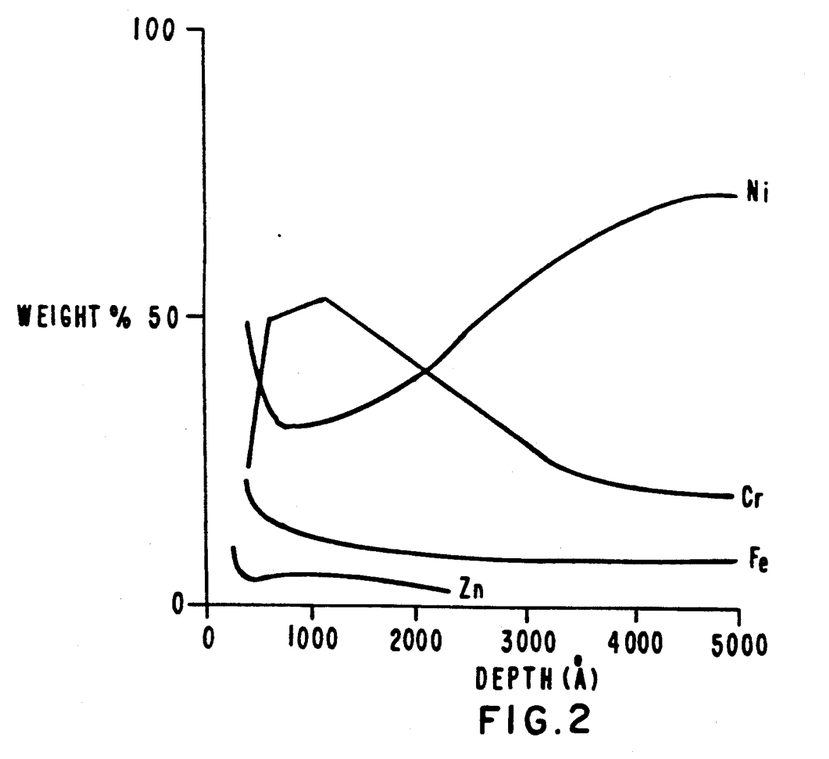
FIG. 2 is an Auger electron spectroscopy depth profile of a film which formed on an Alloy 600 test specimen in the course of the improved practice.

FIG. 2 shows the composition profile of the film on an Alloy 600 test specimen of the above-mentioned test, which was determined by Auger electron spectroscopy. This profile clearly shows the incorporation of zinc in the outer layers of the oxide surface.

Additional crack initiation tests were conducted on Alloy 600 test specimens in aqueous solutions simulating primary coolant water conditions. Thus the control solution contained 1-2500 ppm boron, 0.1-10 ppm lithium and 15-75 cc (STP) hydrogen. Other specimens were tested in a similar solution also containing 50 ppb zinc.

Figure 3:
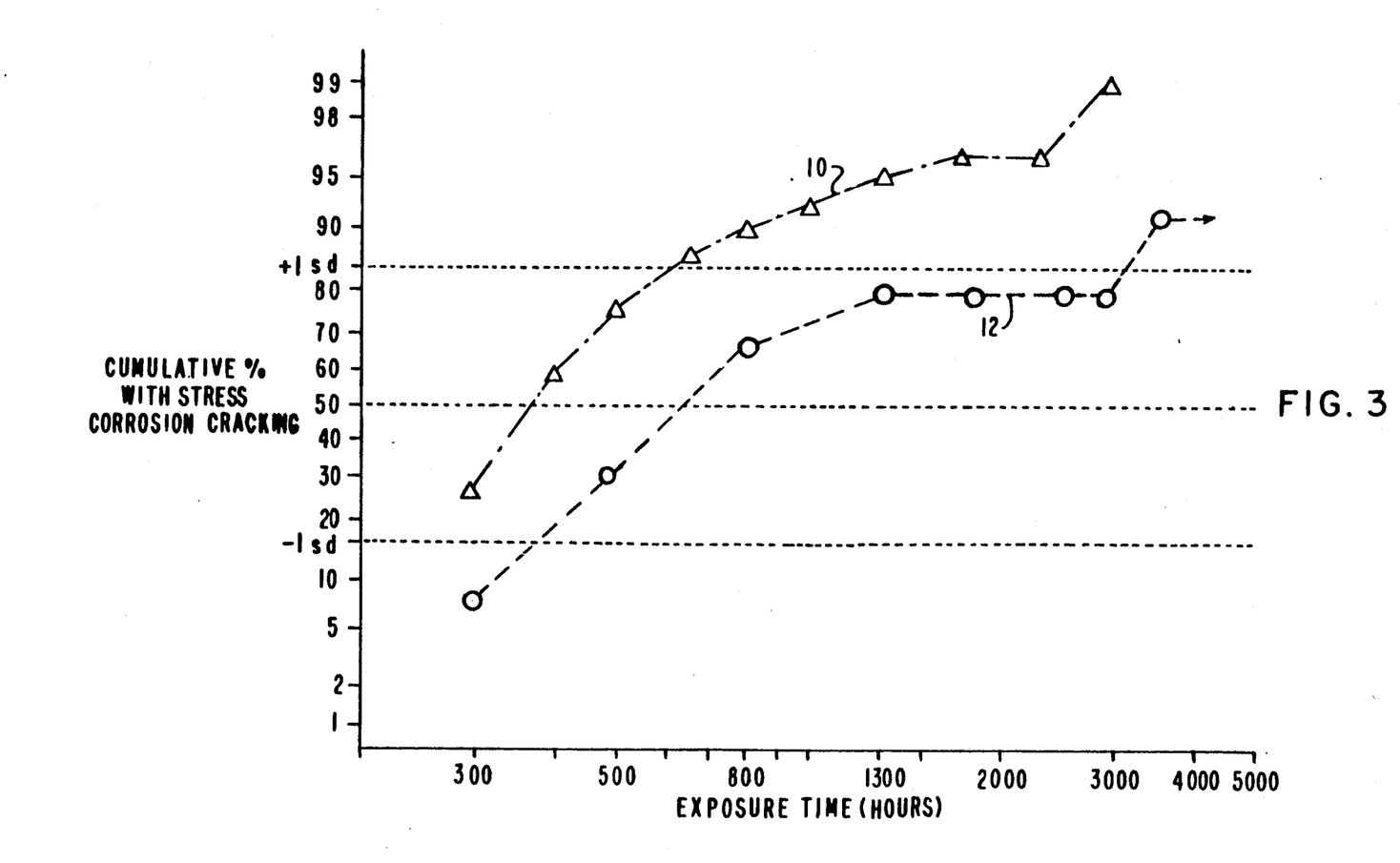
FIGS. 3-5 are graphs showing the crack initiation times of test specimens taken from tubes fabricated from two Alloy 600 heats in a prior art practice and in the improved practice.
Figure 4:
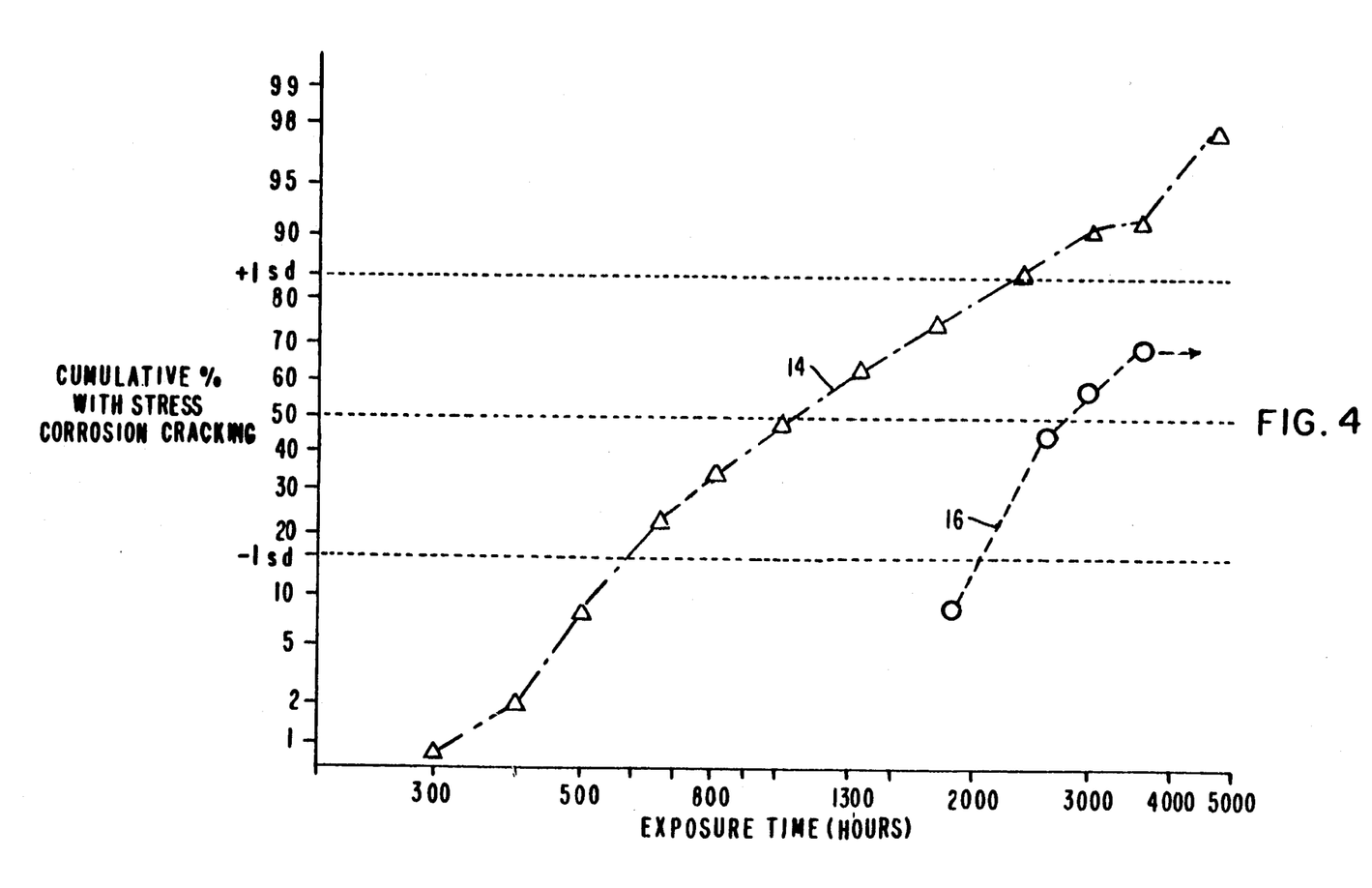
Figure 5:
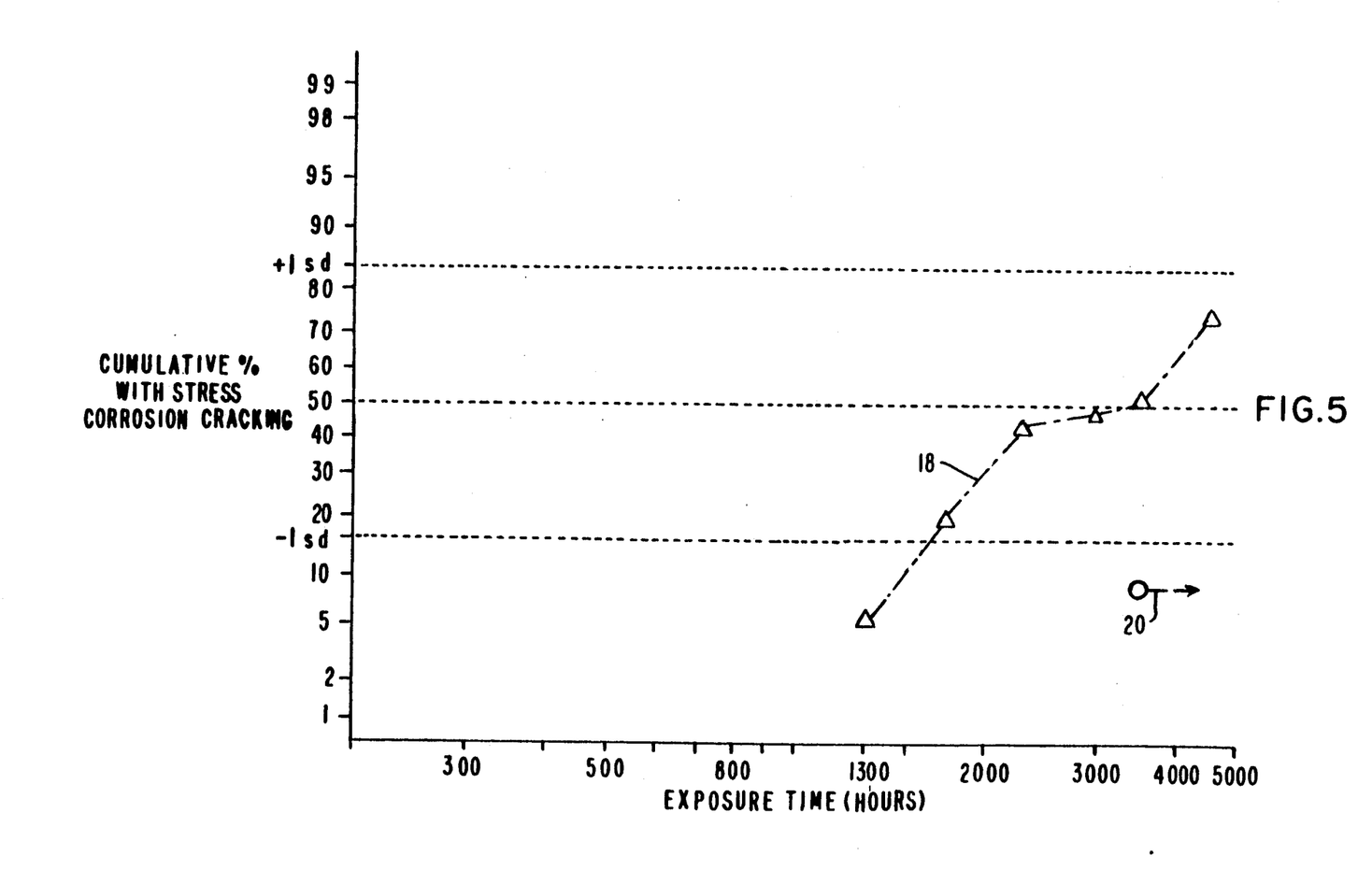

FIGS. 3-5 show the cumulative percent of these specimens which developed cracks over time. Curves 10 and 12 of FIG. 3 relate to Alloy 600 specimens from a Heat A which is susceptible to cracking. Curves 14 and 16 of FIG. 4 relate to Alloy 600 specimens from a Heat B which is less susceptible to cracking. Both Heats A and B were mill annealed. Curve 18 and point 20 of FIG. 5 relate to Alloy 600 specimens from a third heat (Heat C) which was thermally treated. Curves 10 (Heat A), 14 (Heat B) and 18 (Heat C) relate to the specimens tested in the control solution. Curves 12 (Heat A) and 16 (Heat B) and point 20 (Heat C) relate to the specimens tested in the solution containing zinc. A comparison of the curves shown in FIGS. 3 and 4 indicates that in the zinc environment the crack initiation times were increased by a factor of two or more. A comparison of Curve 18 with point 20 on FIG. 5 indicates that in the zinc environment the stress corrosion crack initiation time of the thermally treated Heat C specimens was significantly increased as well.

Surface characterization tests were conducted on the following specimens of Table I:

TABLE I

| Specimen | Exposure (HRS) | Surface |
|---|---|---|
| A | 2500 | tube outside diameter, not electropolished |
| B | 2500 | tube outside diameter, electropolished |
| C | 2500 | tube inside diameter, not electropolished |
| D | 1300 | tube inside diameter, not electropolished |
| E | 2950 | tube inside diameter, not electropolished |

Tube specimens A, B and C, which were actually three locations on the same tube, were exposed to the zinc-containing solution. Tube specimens D and E were exposed to the control (i.e., no added zinc) solution. The analysis of the surface oxides as determined by Auger electron spectroscopy are indicated as weight percent on the following Table II:

TABLE II

| Specimen | Cr | Fe | Ni | Zn | C | O | B | Cl | Na | S |
|---|---|---|---|---|---|---|---|---|---|---|
| A | 8.05 | 7.59 | 17.95 | 4.84 | 25.67 | 29.23 | 0.00 | 0.71 | 5.61 | 0.34 |
| B | 8.90 | 6.70 | 19.10 | 3.38 | 26.01 | 30.69 | 0.61 | 0.19 | 3.92 | 0.49 |
| C | 6.65 | 4.44 | 31.03 | 1.96 | 20.16 | 32.47 | 1.87 | 0.19 | 0.73 | 0.49 |
| D | 3.60 | 4.34 | 39.72 | 0.28 | 18.49 | 30.13 | 2.36 | 0.18 | 0.90 | 0.00 |
| E | 5.26 | 4.04 | 46.43 | 0.17 | 9.34 | 30.94 | 2.80 | 0.12 | 0.64 | 0.27 |

It is noted that the analyses indicate the presence of substantial amounts of carbon which is not actually present in the oxide but is due to extraneous sources. Thus, the values on Table II have been recalculated to indicate the amount of each element on a carbon-free basis on the following Table III:

TABLE III

| Specimen | Conversion Factor | Cr | Fe | Ni | Zn | O | B | Cl | Na | S |
|---|---|---|---|---|---|---|---|---|---|---|
| A | 1.35 | 10.9 | 10.2 | 24.2 | 6.5 | 39.5 | 0.0 | 1.0 | 7.6 | 0.5 |
| B | 1.35 | 12.0 | 9.1 | 25.8 | 4.6 | 41.4 | 0.8 | 0.3 | 5.3 | 0.7 |
| C | 1.25 | 8.3 | 5.6 | 38.8 | 2.5 | 41.5 | 2.3 | 0.2 | 1.0 | 0.6 |
| C | 1.23 | 4.4 | 5.3 | 48.9 | 0.34 | 37.1 | 2.9 | 0.2 | 1.1 | 0.0 |
| E | 1.10 | 5.8 | 4.4 | 51.1 | 0.20 | 34.0 | 3.1 | 0.1 | 0.7 | 0.3 |

Figure 6:
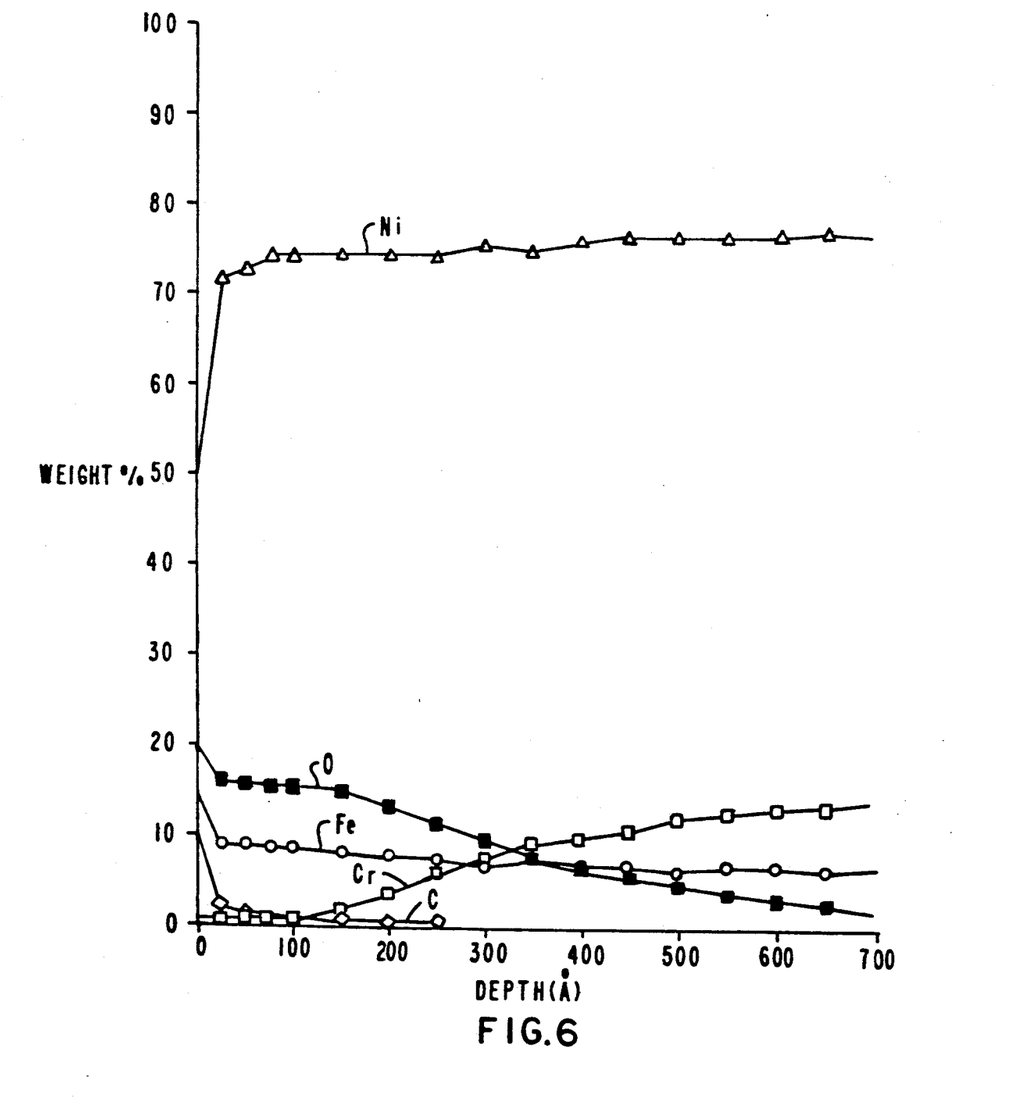
FIG. 6 is an Auger electron spectroscopy depth profile of a film when formed on an Alloy 600 test specimen in the prior art practice.
Figure 7A:
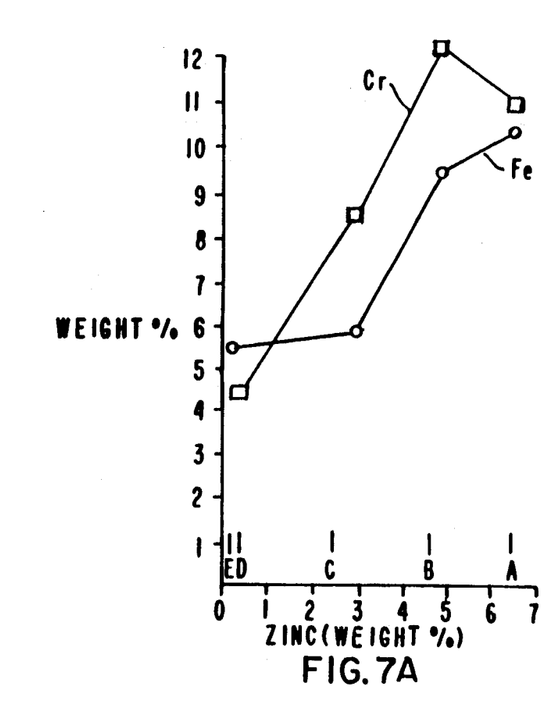
FIG. 7 is a graph showing the effect of zinc concentration upon the oxide film of an Alloy 600 test specimen.
Figure 7B:
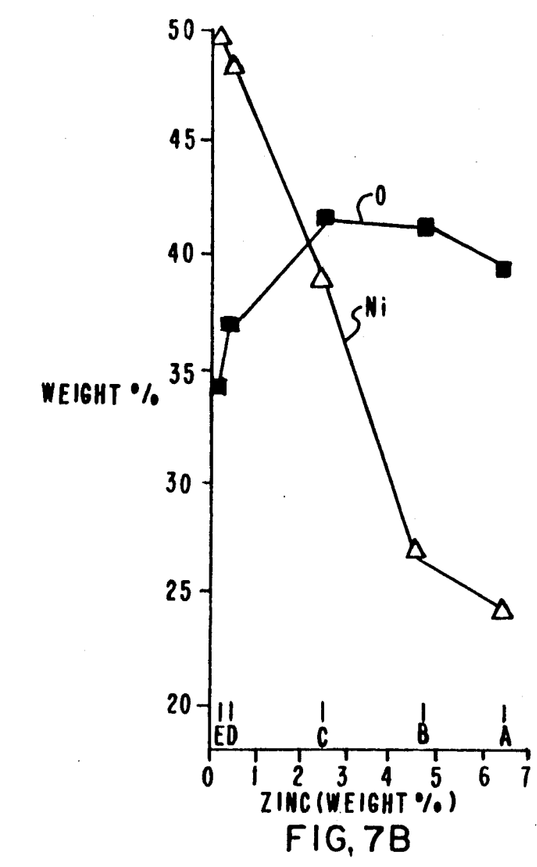

The data of Tables II and III are graphically presented by FIGS. 6 and 7. FIG. 6 is a normalized Auger depth analysis of the oxide on Specimen D, which was exposed to the control solution. FIG. 6 shows that the carbon concentration rapidly declines in the top 50 Angstroms of the oxide. FIG. 7 shows the value of chromium, iron, nickel and oxygen concentrations as a function of zinc content at the surface of the oxide. FIG. 7 shows that an increase in zinc content corresponds to an increased chromium and iron content with some increase in oxygen content at the surface of the oxide. Table III indicates that oxides containing more than about 3 w/o zinc contain very little boron (from the primary coolant of pressurized water reactors) whereas the boron concentration of oxides containing 2.5 w/o zinc or less is a factor of 2-3 times higher.

While a presently preferred practice of the invention has been described, it is to be distinctly understood that the invention is not limited thereto but may be otherwise practiced within the scope of the following claims.

What is claimed is:

1. A method of inhibiting stress corrosion cracking in a pressurized water nuclear reactor, comprising the steps of:
   (a) circulating coolant water through the primary cooling circuit of a pressurized water nuclear reactor in contact with nickel base alloys comprising at least about 60 w/o nickel, about 13-30 w/o chromium and about 0.3-12 w/o iron,
   (b) maintaining the coolant water composition at
       about 1-2500 ppm boron,
       about 0.1-10 ppm lithium, and
       about 15-75 cc (STP) hydrogen/kg water,
   (c) maintaining the coolant water pH between about 5.2 and about 7.4 at 20° C. and conductivity between about 1 and 30 μS/cm at 20° C.; and
   (d) adding zinc to the coolant water in amounts sufficient to maintain the zinc concentration between about 5 and about 1000 ppb.

2. The method of claim 1, wherein
   the coolant water is maintained between about 100 and 1000 ppm boron and between about 0.1 and 3 ppm lithium and at a pH between about 6.0 and 7.2, and
   the zinc is added to the coolant water in amounts sufficient to maintain a zinc concentration between about 10 ppb and about 200 ppb.

3. A method of inhibiting stress corrosion cracking of nickel alloy components in a steam generator in a primary coolant circuit of a nuclear reactor, comprising the steps of:
   oxidizing the surfaces of components disposed in a steam generator in a primary coolant circuit of a nuclear reactor which comprise at least about 60 w/o nickel, about 13-30 w/o chromium and about 0.3-12 w/o iron;
   introducing zinc into the top 50 Angstroms of the oxidized surface to produce a zinc concentration therein of at least 1 w/o; and
   circulating primary coolant through the circuit at a temperature greater than about 330° C.

4. The method of claim 3, by producing the 1 w/o zinc concentration before circulating the primary coolant.

5. The method of claim 4, by circulating primary coolant containing less than 1 ppb zinc.

6. The method of claim 3, by producing the 1 w/o zinc concentration with the circulating primary coolant.

7. The method of claim 3, by oxidizing and introducing zinc into the surfaces of the components to produce in the top 50 Angstroms of the surfaces an oxide comprising at least about 15 w/o nickel, about 5-20 w/o chromium, about 2-20 w/o iron, about 3-7 w/o zinc and at least about 25 w/o oxygen as determined by electron spectroscopy.

8. The method of claim 3, by circulating primary coolant as an aqueous solution containing about 1-2500 ppm boron, about 0.1-10 ppm lithium, about 15-75 cc (STP) hydrogen/kg solution, and about 5-20 ppb zinc, and has a pH at 20° C. of about 5.2-7.4 and a conductivity at 20° C. of about 1-30 μS/cm.

9. A nuclear reactor having a primary coolant circuit with mechanically stressed components wetted by a primary coolant, which components are fabricated from an alloy comprising at least about 60 w/o nickel, about 13-30 w/o chromium and about 0.3-12 w/o iron and have oxidized surfaces wetted by the primary coolant comprising about 1-10 w/o zinc (as determined by electron spectroscopy) in their top 50 Angstroms, the oxidized surfaces of the components at a temperature of at least about 330° C.

10. A steam generator in a primary coolant circuit of a nuclear reactor having mechanically stressed components wetted by a primary coolant; which components are fabricated from an alloy comprising at least about 60 w/o nickel, about 13-30 w/o chromium and about 0.3-12 w/o iron and have oxidized surfaces wetted by the primary coolant comprising about 1-10 w/o zinc (as determined by electron spectroscopy) in their top 50 Angstroms.

11. The steam generator of claim 10, wherein the top 50 Angstroms of the oxidized surfaces of the mechanically stressed components comprise at least about 15 w/o nickel, about 5-20 w/o chromium, about 2-20 w/o iron, about 3-7 w/o zinc and at least about 25 w/o oxygen.

12. The steam generator of claim 11, wherein the top 50 Angstroms of the oxidized surfaces of the mechanically stressed components comprise about 24-36 w/o nickel, about 8-12 w/o chromium, about 5-10 w/o iron, about 4-6 w/o zinc and about 35-45 w/o oxygen.

13. The steam generator of claim 11, wherein the mechanically stressed components are fabricated from alloys comprising 14-17 w/o chromium, 6-10 w/o iron, up to 0.5 w/o silicon, up to 10 w/o manganese, no more than 0.5 w/o carbon, no more than 0.015 w/o sulfur and the balance nickel, the nickel concentration being at least 72 w/o.

14. The steam generator of claim 10, wherein the components comprise bent tubes.

15. The steam generator of claim 14, wherein the tubes have U bends.

16. The steam generator of claim 10, wherein the components comprise expanded tubes.

17. The steam generator of claim 10, wherein the components comprise tube plugs.

18. The steam generator of claim 10, in a pressurized water reactor system.

19. The steam generator of claim 10, wherein the components are at a temperature greater than about 330° C.

20. The method of claim 1, wherein the zinc is added as zinc borate.

* * * * *